Patented Oct. 20, 1953

2,656,288

UNITED STATES PATENT OFFICE 2,656,288

PROCESS OF SURFACE TREATMENT FOR IMPROVING WEATHERING RESISTANCE OF CELLULOSE ACETATE-BUTYRATE PLASTICS

John W. Tamblyn and Roger M. Schulken, Kingsport, Tenn., assignors to Eastman Kodak Company, Rochester, N. Y., a corporation of New Jersey No Drawing. Application March 21, 1952, Serial No. 277,904

1 Claim. (Cl. 117—144)

This invention relates to surface treatment of cellulose acetate-butyrate plastics to improve their weathering characteristics. More particularly it relates to surface treatment of molded objects of cellulose acetate-butyrate plastics.

An object of our invention is to retard the loss in mechanical properties of cellulose acetate-butyrate plastics when exposed to weathering. Another object is to improve the resistance of these plastics to change of surface appearance on weathering.

Cellulose acetate-butyrate plastic compositions, particularly pigmented plastics of this nature, are apt to become brittle during weathering before any large amount of molecular breakdown has occurred throughout the body of the plastic. This may be due to:

*a.* Confinement of breakdown, because of pigment opacity, to a thin surface layer which adheres firmly enough to the underlying undamaged layers to cause propagation of brittle surface breaks throughout the piece;

*b.* Presence of surface stresses in the molded pieces which lead to surface cracking with resultant loss in mechanical properties of the whole piece.

In the latter case, the appearance of the plastic piece also suffers greatly.

We have found that the weathering properties of cellulose acetate-butyrate plastic objects can be improved by immersing the plastic piece for a short period of time in a bath consisting of a mixture of ethyl alcohol with an ethyl ester selected from the group consisting of tetraethyl silicate and diethyl carbonate. In the case of tetraethyl silicate, immersing the plastic piece for 15 minutes in a mixture consisting of 75 parts of ethyl alcohol and 25 parts of tetraethyl silicate is effective; in the case of diethyl carbonate, immersing the plastic piece for 15 minutes in a mixture consisting of 50 parts of ethyl alcohol and 50 parts of diethyl carbonate is effective. In both cases, the immersion may be carried out at room temperature.

Example 1

Compression-molded samples, 3" x ½" x 0.050", from a rolled composition consisting of 100 parts of cellulose acetate-butyrate (37% butyryl; 13% acetyl), 12 parts of dibutyl sebacate and 2 parts of titanium dioxide pigment of the anatase form were immersed for 15 minutes in a 75:25 mixture of ethyl alcohol and tetraethyl silicate. No discoloration was caused by the treatment. After drying, the pieces were exposed in an Atlas twin-arc weather-ometer set on the 51 min.: 9 min. dry:wet cycle with sample drum revolving once a minute. Untreated samples of the same composition were included in the test. The untreated samples suffered a 25% loss in inherent viscosity in 700 hours exposure; the treated samples required 1800 hours exposure for the same loss in inherent viscosity. Brittleness developed in 500 hours in the untreated samples; brittleness did not develop until 700 hours exposure in the treated samples. At the end of 1500 hours exposure, cracks were found in the surface of the untreated samples; no cracks were found in surface of the treated samples. Inherent viscosities were measured in acetone solutions at a concentration of 0.23 g. per 100 cc. Brittleness was defined as a break at bend angles of less than 90° when the piece was bent in the Tour-Marshall test for stiffness in flexure (A. S. T. M. D747-43T).

Example 2

Test pieces similar to those described in Example 1 were soaked for 15 minutes in a 50:50 mixture of ethyl alcohol and diethyl carbonate. Considerable swelling and some solution occurred. After drying, the surfaces of the pieces had a deep-glossy luster. No discoloration was caused by the treatment. This smooth, glossy appearance was retained for a remarkably long time on exposure in the test described in Example 1, namely for 2000 hours. Twenty-five per cent loss in inherent viscosity did not occur until 1300 hours exposure, as compared to 700 hours for the untreated samples. Brittleness developed after 1000 hours, as compared to 500 hours for the untreated samples. In outdoor exposure in Arizona, at the end of 30 months a sample of the same composition as above, treated in the same way with 50:50 ethyl alcohol and diethyl carbonate, retained a smooth, clean surface, only slightly diminished in gloss, whereas a similar sample, not treated according to our invention but which had been given a conventional solvent polishing by immersion in 50:50 acetone:butyl acetate, was found to have a soiled, rough surface with crazing along the edges.

It will be understood that the plasticizer, the method of compounding the plastic, and the method of molding form no part of our invention, and that they may be varied within the limits of the prior art. Many plasticizers for cellulose acetate-butyrate are known in the art. The proportion of plasticizer may be varied, according to the flow and mechanical properties desired. The plastic may be compounded by methods other than rolling; the molding may be carried out by methods other than compression molding. The percentage of acetyl and butyryl in the cellulose acetate-butyrate may also be varied.

What we claim as our invention and desire to be secured by Letters Patent of the United States is:

A process of improving the weathering characteristics of molded articles of cellulose acetate-butyrate plastics, which comprises immersing the article for a period of approximately 15 minutes in a 50:50 ethyl alcohol:dimethyl carbonate mixture.

JOHN W. TAMBLYN.
ROGER M. SCHULKEN.

References Cited in the file of this patent

UNITED STATES PATENTS

| Number | Name | Date |
| --- | --- | --- |
| 1,809,755 | King et al. | June 9, 1931 |
| 2,431,873 | Kennelly | Dec. 2, 1947 |